US006897974B1

(12) United States Patent
Coker

(10) Patent No.: US 6,897,974 B1
(45) Date of Patent: May 24, 2005

(54) PRINT SYSTEM FOR PRINTING TO A REMOTE PRINTING APPARATUS

(75) Inventor: Andrew R. Coker, Menai New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 09/668,461

(22) Filed: Sep. 25, 2000

(30) Foreign Application Priority Data

Sep. 29, 1999 (AU) .............................................. PQ3142

(51) Int. Cl.[7] .......................... G06K 15/00; G06F 15/00
(52) U.S. Cl. ..................... 358/1.15; 358/1.13; 358/1.16
(58) Field of Search ................. 358/1.1–1.9, 1.11–1.18; 345/581, 594, 661, 700, 733, 734, 736; 709/201, 321, 322–329

(56) References Cited

U.S. PATENT DOCUMENTS 5,450,571 A * 9/1995 Rosekrans et al. ......... 358/1.13
5,692,111 A    11/1997 Marbry et al. .............. 395/114
5,784,177 A *  7/1998 Sanchez .................... 358/1.15
5,995,723 A    11/1999 Sperry et al. ............... 395/114

FOREIGN PATENT DOCUMENTS

JP          11-249851         9/1999    .......... G06F/15/00

* cited by examiner

*Primary Examiner*—King Y. Poon
(74) *Attorney, Agent, or Firm*—Fitzpatrick, Cella, Harper & Scinto

(57) ABSTRACT

A printing system comprising storage means (306) in a client computer (112) for storing a client service item file (310) which comprises a set of user selectable service items (e.g., 804). Each service item (804) comprises a set of printing attributes (806–824). The client service item file (310) is updated in accordance with communication with an external apparatus (222). The system also has a client computer user interface (500, 502) by means of which a user can select a particular one of the service items (e.g., 804) having a particular set of printing attributes (806–824). The system also has a client computer print process driver (200) adapted to process a print job (118) according to the particular set of printing attributes.

40 Claims, 8 Drawing Sheets

Figure 5:
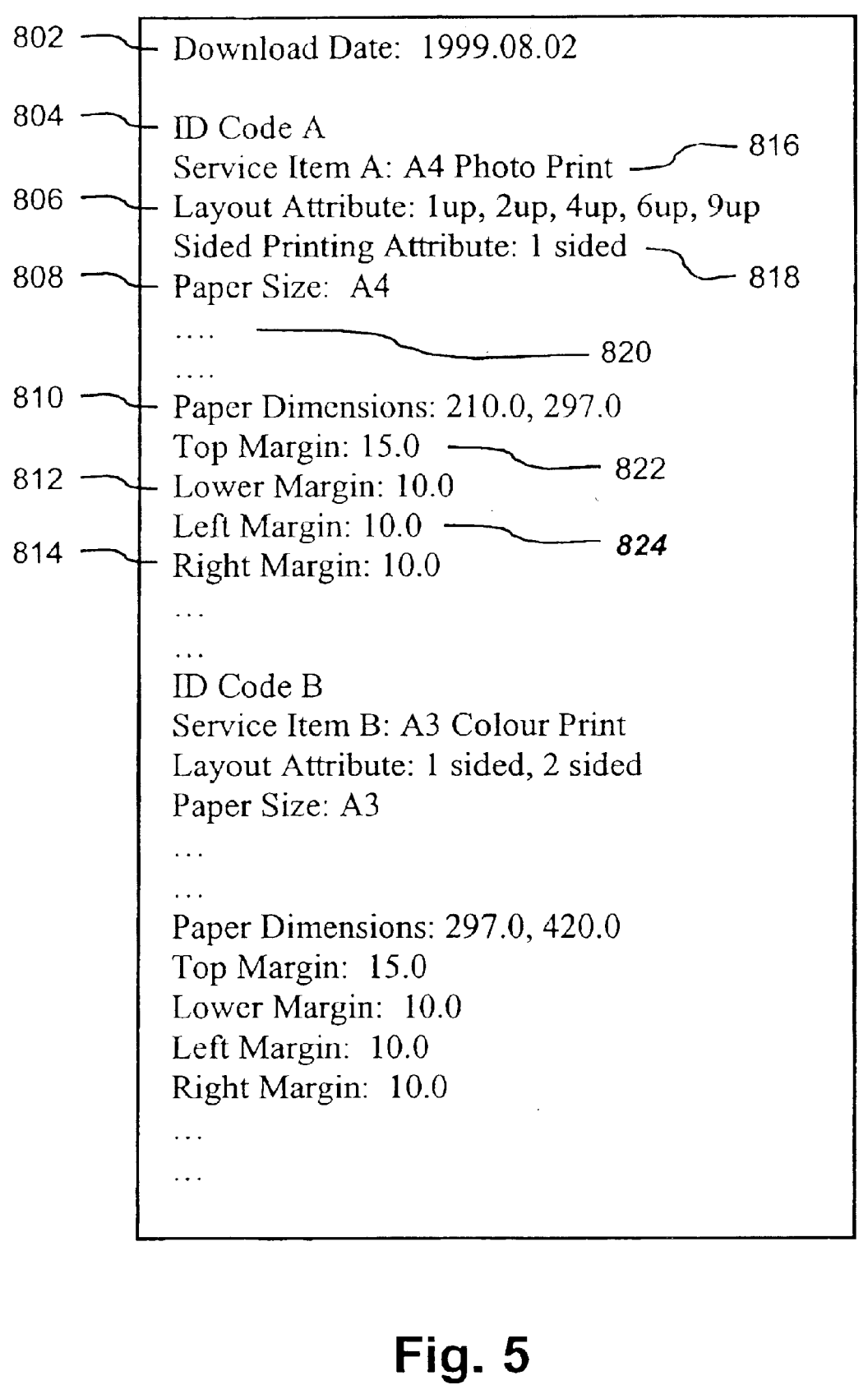

802 — Download Date: 1999.08.02

804 — ID Code A
Service Item A: A4 Photo Print — 816
806 — Layout Attribute: 1up, 2up, 4up, 6up, 9up
Sided Printing Attribute: 1 sided — 818
808 — Paper Size: A4

....
                                    — 820
....

810 — Paper Dimensions: 210.0, 297.0
Top Margin: 15.0 — 822
812 — Lower Margin: 10.0
Left Margin: 10.0 — 824
814 — Right Margin: 10.0

...

...

ID Code B
Service Item B: A3 Colour Print
Layout Attribute: 1 sided, 2 sided
Paper Size: A3

...

...

Paper Dimensions: 297.0, 420.0
Top Margin: 15.0
Lower Margin: 10.0
Left Margin: 10.0
Right Margin: 10.0

PRINT SYSTEM FOR PRINTING TO A REMOTE PRINTING APPARATUS

TECHNICAL FIELD OF THE INVENTION

The present invention relates generally to the field of computer device drivers, and in particular, to print drivers. The present invention relates to a system, method and apparatus for printing a print job from a local device to a remote printer. The invention also relates to a computer program product including a computer readable medium having recorded thereon a computer program for printing a print job.

BACKGROUND ART

FIG. 1 is a system level block representation of a computer 112 attached to a local printer 108. A local application 100 running on the computer 112 receives an input 116 from a user (not shown). Use of the local application 100 results in an internal representation 118 being produced within the application 100, and this can be stored as a print file 102. The nature of the internal representation 118, and the paint files 102, will depend upon the specifics of the local application 100. Therefore, if the local application 100 is a word processor for example, the internal representation 118 and the corresponding print files 102 correspond to word processing documents. The internal representation 118 of a document, can be retrieved from a stored print file 102, or be directly produced by interaction with the user as depicted by the arrow 116, and in both instances can be conveyed by means of a printer drive software application 106 to the local printer 109. The print file 102, and its internal representation 118, will be referred to interchangeably in the rest of the specification, the particular meaning intended being clear from the context. The printer driver 106 acts as a mediation software application between the computer 112, and the particular local printer 108 to which the print file 102 is being printed. The printer driver thus enables the local printer to be made compatible with the computer, allowing a printed output 110 to be produced. For general convenience, the computer 112 and local printer system 114 are typically situated in close proximity to each other.

In the event that the computer 112 and local printer system 114 are connected to each other by means of a local area network, or LAN, (not shown), the computer 112 can have at its disposal a number of different printer systems 114. In such an event, a number of different types of local printer can be connected to the LAN, and the computer 112 requires a specific printer driver 106 for each different printer 108. At least two problems are apparent in the aforementioned arrangement. In the first instance, a possibly large number of printer drivers must be installed on the computer so that the various printer facilities available on the LAN can be accessed. Secondly, the user of the computer is typically unaware of new devices which have been added to the LAN, or disconnected from the LAN. Consequently, the user is unable to take advantage of any new capabilities which may have been added, and is also not fully updated as to which capabilities may have been removed.

DISCLOSURE OF THE INVENTION

It is an object of the present invention to substantially overcome, or at least ameliorate, one or more disadvantages of existing arrangements.

According to a first aspect of the invention, there is provided a printing system comprising storage means in a client computer for storing a client service item file which comprises a set of user selectable service items, each service item comprising a set of printing attributes; wherein said client service item file is updated in accordance to communication with an external apparatus; and a client computer user interface by means of which a user can select a particular one of said service items having a particular set of printing attributes; and a client computer print process driver adapted to process a print job according to said particular set of printing attributes.

According to a second aspect of the invention, there is provided a print process driver adapted to process a print job according to a particular set of printing attributes, said attributes characterising a particular service item selected by a user from a client service item file which comprises a set of user selectable service items, each service item comprising a set of printing attributes, said client service item file being stored in a storage means tin a client computer, wherein said client service item file is updated in accordance to communication with an external apparatus.

According to another aspect of the invention, there is provided a method of printing a print job comprising steps of:

storing, in a storage means in a client computer, a client service item file which comprises a set of user selectable service items, each service item comprising a set of printing attributes;

updating said client service item file in accordance to communication with an external apparatus;

selecting, by a user by means of a client computer user interface a particular one of said service items having a particular set of printing attributes; and processing, by a client computer print process driver a print job according to said particular set of printing attributes.

According to another aspect of the invention there is provided a computer readable memory medium for storing a program for apparatus which prints a print job, said program comprising:

code for a storing step for storing, in a storage means in a client computer, a client service item file which comprises a set of user selectable service items, each service item comprising a set of printing attributes;

code for an updating step for updating said client service item file in accordance to communication with an external apparatus;

code for a selecting step for selecting, by a user by means of a client computer user interface a particular one of said service items having a particular set of printing attributes; and code for a processing step for processing, by a client computer print process driver a print job according to said particular set of printing attributes.

BRIEF DESCRIPTION OF THE DRAWINGS

A number of preferred embodiments of the present invention will now be described with reference to the drawings, in which:

FIG. 5 shows an exemplary service item file;

DETAILED DESCRIPTION INCLUDING BEST MODE

Figure 1:
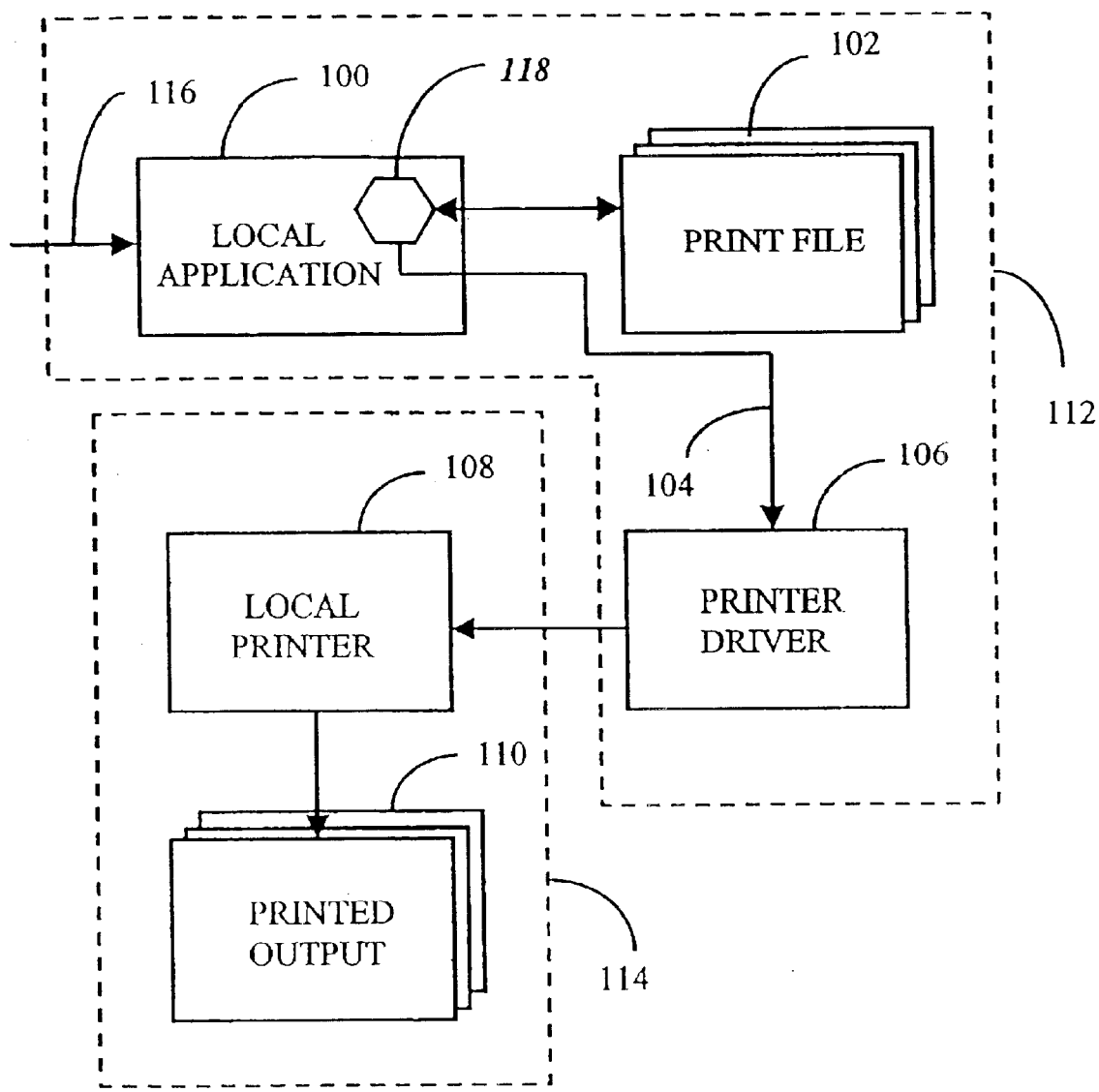
FIG. 1 is a system level block representation of a computer/printer arrangement in the prior art.

Where reference is made in any one or more of the accompanying drawings to steps and/or features, which have the same reference numerals, those steps and/or features have for the purposes of this description the same function (s) or operation(s), unless the contrary intention appears.

Figure 2:
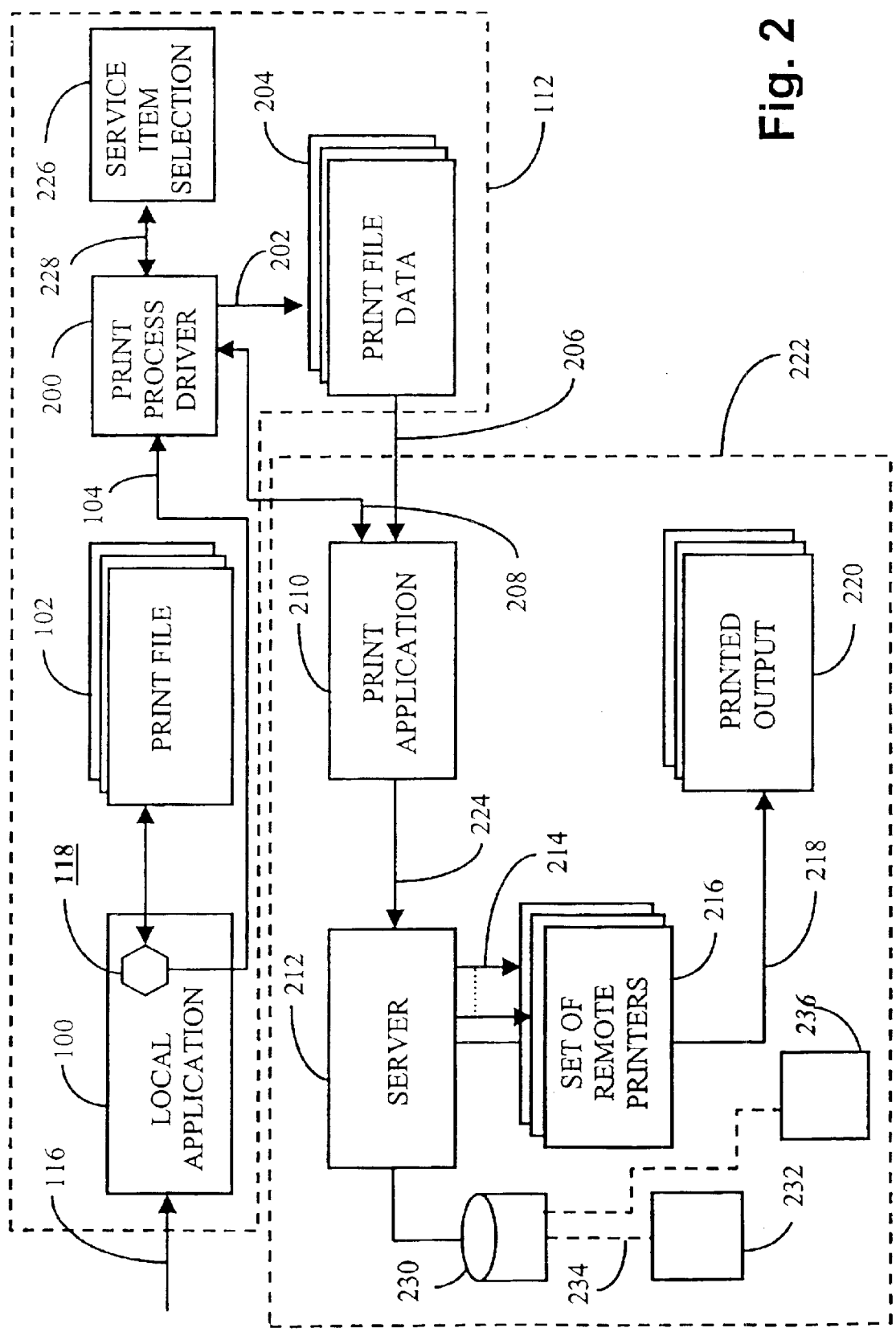
FIG. 2 shows a system level block representation of the preferred embodiment.

FIG. 2 shows a computer 112 connected to a print system 222 by two lines 206, 208. The device 112 is referred to as a "client computer", however it is apparent that any device capable of running an application producing a job to be printed is considered to fall within the term. This direct connection is shown in FIG. 2 for ease of representation, however it is apparent that the aforementioned direct lines can, in fact, be replaced by a network (not shown explicitly). FIG. 2 further shows how the computer 112 is able to print a print file 102 using one of a set of remote printers 216. As described in relation to FIG. 1, it is understood that the print file 102 is printed, for example, after "reading" the print file from storage, and converting it into an internal representation 118. Alternately, the internal representation 118 can be produced directly by interaction between the user and the local application 100 as depicted by the arrow 116.

A local application 100 running on the computer 112 produces a print file 102 which is conveyed to a print process driver 200 as depicted by an arrow 104. The print process driver 200 converts the print file 102 into print file data 204 according to a first set of attributes which the user of the computer 112 has specified in relation to the print job. The aforementioned set of attributes is called a Service Item, which the user specifies in an interactive process 226 described in relation to FIGS. 3, 4 and 5. A print application 210, which belongs conceptually to the printer system 222, is able to receive the print file data 204 as depicted by an arrow 206. In addition, the print application 210 communicates with the print process driver 200 as depicted by a bi-directional arrow 208.

This communication between the print application 210 and the print process driver 200 allows the print application 210 which is "network printer aware" to communicate updating information regarding the set of printers 216 to the print process driver 200. In so doing, the print application 210 provides the user of the computer 112 with an up to date perception of printer capabilities provided by the set of remote printers 216, thus allowing the user to choose from an updated set of printer capabilities available on the server 212. Graphical icons used to depict service items are also updated as part of the same updating process. The print file 102 generated by the application 100 is processed by the print process driver 200 to produce the print file data 204. This process, extending from the local application 100 and resulting in the print file data 204, can be repeated by the user in respect of multiple local applications 100, with the resultant print file data 204 for each local application 100 being stored locally on the machine 112. In one embodiment, a custom port monitor with an associated output can be installed when installing the print application 210. The port monitor receives the data 204 from the print process driver 200, and stores the print file data 204 to disc, rather than passing the data directly to a printer.

When the user wishes to print one or more of the print file data 204, the user initiates communication between the computer 112 and the print application 210. Once this communication is established, the print application 210 can retrieve the print file data 204, and by means of a remote printer server 212, the print application 210 can convey the print file data 204 to one of a set of remote printers 216. It is noted that the production of the print file 102 and the subsequent production and storage of the print file data 204, are decoupled from the subsequent printing of the print file data 204 on one of the remote printers 216.

The server has a storage device 230, which stores, as depicted by a dashed line 234, a service item file 232 containing service item definitions associated with the set of remote printers 216. The server is aware in real time of changes to the set of remote printers 216, and accordingly knows when printers are removed from the set 216, or when new printers are added thereto. The server also knows when new paper sizes or types, or new inks, are made available. The particular remote printer selected from the set of remote printers 216 depends upon the particular attributes in the Service Item selected by the user of the computer 112 using process 226 in regard to each specific pint file data 204. The server 212 considers the service item attributes selected by the user, and selects an appropriate printer from the remote set 216. The server 212 thus matches a service item which has been selected by the user using the service item selection process 226, to a corresponding service item in the service item file 232, and directs the print job to the appropriate printer in the set 216. It is noted that in directing the print job to an appropriate printer, paper size and type, and also type of ink, play a part in the selection. The selected printer then produces the desired printed output 220. In addition, the print file data 204 is rendered for printing by either or both the serve 212 and a processor in the selected printer from the set of printers 216.

Figure 3A:
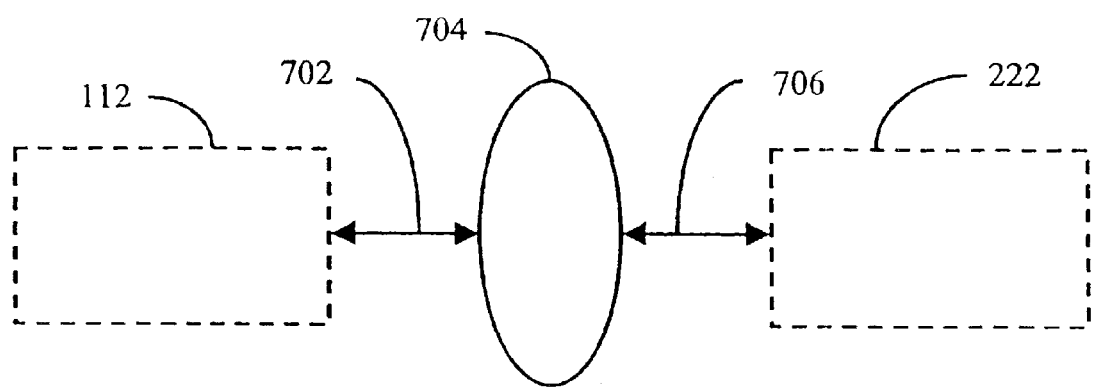
FIG. 3 shows arrangements for connecting the computer to the print system.
Figure 3B:
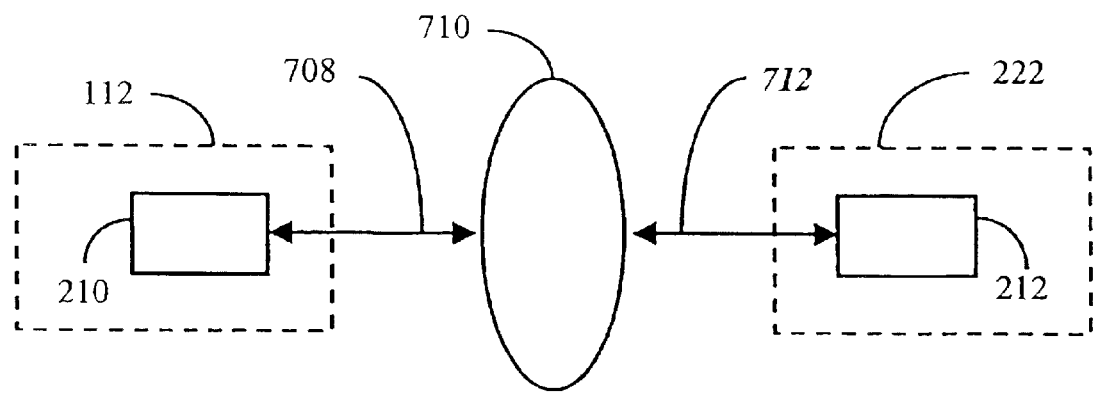

FIGS. 3A and 3B show two arrangements by which the computer 112 can be connected to the print system 222. In FIG. 3A, the computer 112 is connected by a bilateral connection 702 to a network 704, and thereafter by a bilateral connection 706 to the print system 222. The network 704 can take various forms. In a first form the network 704 can be a dedicated connection such as the connections 206 and 208 as shown in FIG. 2. In a second form, the network 704 can be a Local Area Network (LAN) serving a restricted local area. In a third form the network 704 can be a Wide Area Network (WAN), such as the Internet, serving an extended area.

In FIG. 3B, the print application 210 (see FIG. 2) is part of the computer 112, rather than part of the print system 222 as depicted in FIG. 2. In this case, the application 210 communicates by mea of a bilateral connection 708 to a network 710, and thereafter, to the server 212 in the print system 222. When the print application 210 establishes communication with the server 212, the print application 210 compares the "client" service item file 310 to the "server" service item file 232, and updates the client service item file as necessary. Thus, for example, the client service item file 310 can be updated if the server service item file 232 has a more recent date 802 (described in more detail in relation to FIG. 5).

Figure 4:
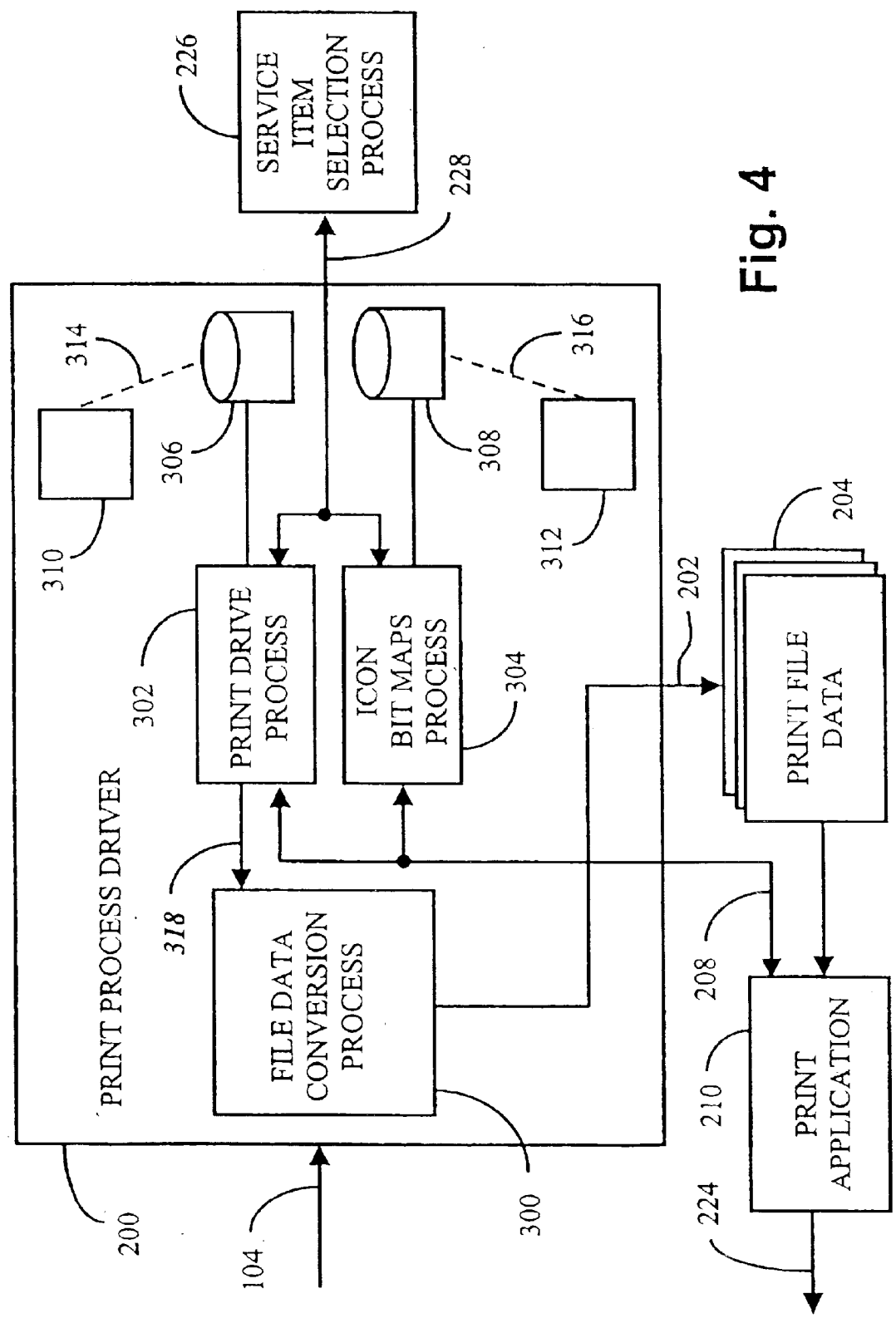
FIG. 4 presents a more detailed view of a print process driver illustrated in FIG. 2.

FIG. 4 provides more detail in regard to the operation of the print process driver 200. The print file 102 is conveyed to the print process driver 200 as depicted by the arrow 104, the print file being delivered to a file data conversion process 300. This process 300 delivers a converted print file data set 204 as depicted by an arrow 202. As noted in regard to FIG. 2, the print file data 204 is stored locally on the computer 112, pending its transmission to a remote printer. The print application 210 communicates with the print process driver 200, as depicted by the bi-directional arrow 208. This bi-directional communication takes place between the print application 210 and a print drive process 302, and also an icon bit map process 304. The print drive process 302 has an associated storage device 306 which stores, as depicted by a dashed line 314, a service item file 310 containing service item definitions associated with the set of remote printers 216, of which the computer 112 is currently aware. The service item file is discussed in relation to FIG. 5. The icon bit map process 304 has a storage device 308 which stores, as depicted by a dashed line 316, an icon file 312 containing icons associated with the service items in the service item file 310. The print drive process service item file 310 is updated by the print application 210 in regard to attributes of the set of remote printers 216, as characterised by the server service item file 232, which is currently connected to the network. The print drive process icon file 312 is updated by the print application 210 in regard to updated icons stored in the server icon file 236.

It will be apparent that the remote devices connected to the aforementioned network are typically in a constant state of flux, with new printers being added, and other printers being removed, on an ongoing basis. The updating process between the server service item file 232 and the client service item file 310, performed by the print application 210, the print drive process 302, and the server 212, thus provides the user of the computer 110 with an updated picture of the printer capabilities available for printing. The print application 210 also communicates icon bit maps stored in the server icon file 236 to the icon bit map process 304, for storage thereof in a client icon file 312, as part of the updating process. These icon bit maps are used in providing explanatory information to the user, when the user makes a print attribute selection.

The Service Selection process 226 allows the user to specify, as depicted by an arrow 228, a desired service item, by making reference to the updated client service item file 310 and the icon bit map file 312. The client service item file 310 is accessed by the user by means of the service item selection process 226, this being described from a user perspective in relation to FIG. 7. The user thereby selects a desired service item from the file 310, and the print drive process 302 provides, as depicted by an arrow 318, the selected service item to the file data conversion process 300. The file data conversion process 300 thereby produces the print file data 204, which is tailored specifically to the service item that the user has selected. Insofar as the service item is specific to a particular printer in the set of printers 216, in relation to the printer physical attributes as well as the paper size and type, and ink type supported, the print file data 204 is printer-device specific. Thus the file data conversion process 300 converts the print file 102 using the service item selected from the service item file 310 by the user who uses the service item selection process 226 for the selection. The selected service item has attributes cg 810 which are physical attributes of the specific printing device, and generic attributes eg 816 which are typically supported by at least some other printers as well. Thus the file data conversion process 300 produces device dependent print file data 204, in which the selected service item already defines a corresponding printer from the set of remote printers 216. As noted previously, the user is able to produce print file data 204, and store this data locally on the computer 112, only later sending it off for printing.

In the event that the available remote printer capabilities on the network have changed between the production of the print file data 204 and the transmission of the print job to the remote printer, an error message will be produced for the user. The error message will prompt the user to arrange that the print file 102 can be read from a memory (not shown) in the computer 112, where it has typically been stored. The print file 102 can then be re-processed by the print process driver 200 using an updated set of attributes defined by a new Service Item specification selected by the user.

The file data conversion process 300 converts a text listing representation of the print file 102 in a first page description language (PDL) used by the local application 100, to a text listing representation in a second page description language, such as Postscript®, used by the to-be-selected remote printer from the remote printer set 216. For example, the family of Windows® operating systems uses Graphic Device Interface functions (GDI)® to place graphical components on the printed page when printing a print file 102 from a local application 100. The print process driver 200, using the file data conversion process 300, produces the required converted print file data to be stored as stored print file data 204 on the local machine, pending its transmission to a remote printer.

FIG. 5 shows an exemplary service item file 800. The file 800 has a date 802 which can be used to determine whether the file is more or less recent than a comparative service item file. A service item "A" has a unique identifier 804 followed by an item name 816, a print page layout attribute 806, an attribute relating to single/multi-sided printing 818, and a paper size 808. A number of ". . . " symbols eg 820 depict that further attributes can be included. Thereafter, a number of "physical" specifically device dependent attributes are noted. A paper dimension 810 together with margin attributes 812, 814, 822, and 824 determine the allowable printable area of a printing medium with is to be printed according to service item A (ie 816).

Figure 6:
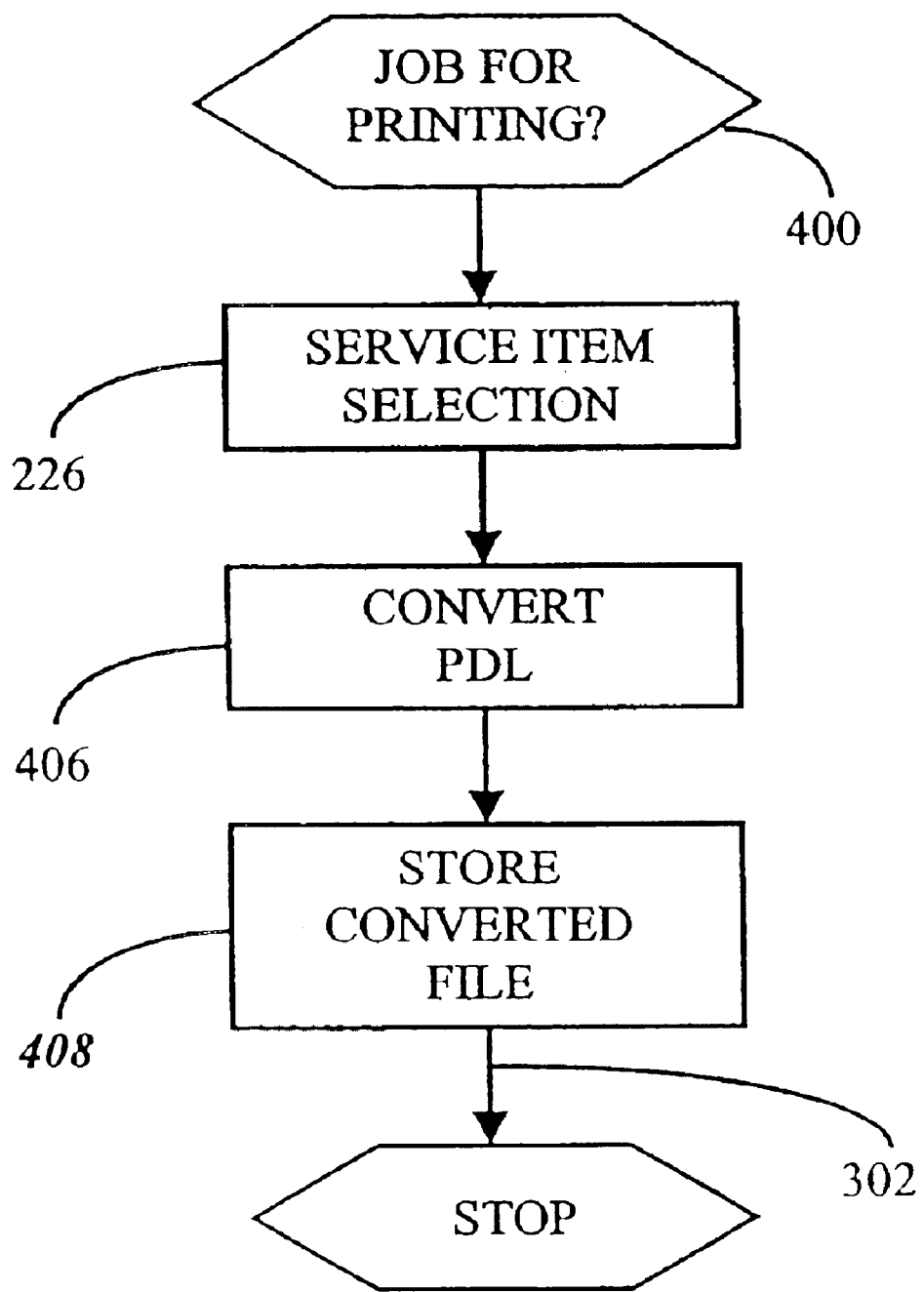
FIG. 6 shows a process flow diagram whereby a print job is printed in the preferred embodiment.

FIG. 6 shows a process flow diagram for the preferred embodiment. Decision process 400 detects whether a job is available for printing. If a print job is available, the process is directed to the Service Item selection process 226. The process 226 causes a dialogue to be initiated with the user, whereby the user selects a set of attributes defining how the job is to be printed. The aforementioned set of attributes are called a Service Item which comprises a variety of parameters associated with available printer models. These parameters include, for each printer model, paper sizes, stationery types (including custom stationery types), colour sets, available resolution, paper orientation, and in addition, possibly special services such as printing to sheets of stickers or business cards. Once the service item is selected and specified in the process 226, the overall process is directed to a conversion process 406 where the Service Item and the print file 102, presently defined in a first page description language used by the local application 100, is converted to a second page description language defined by the service item. Thereafter, the overall process is directed to a storage process 408, whereupon the converted data file is locally stored, pending printing.

Figure 7:
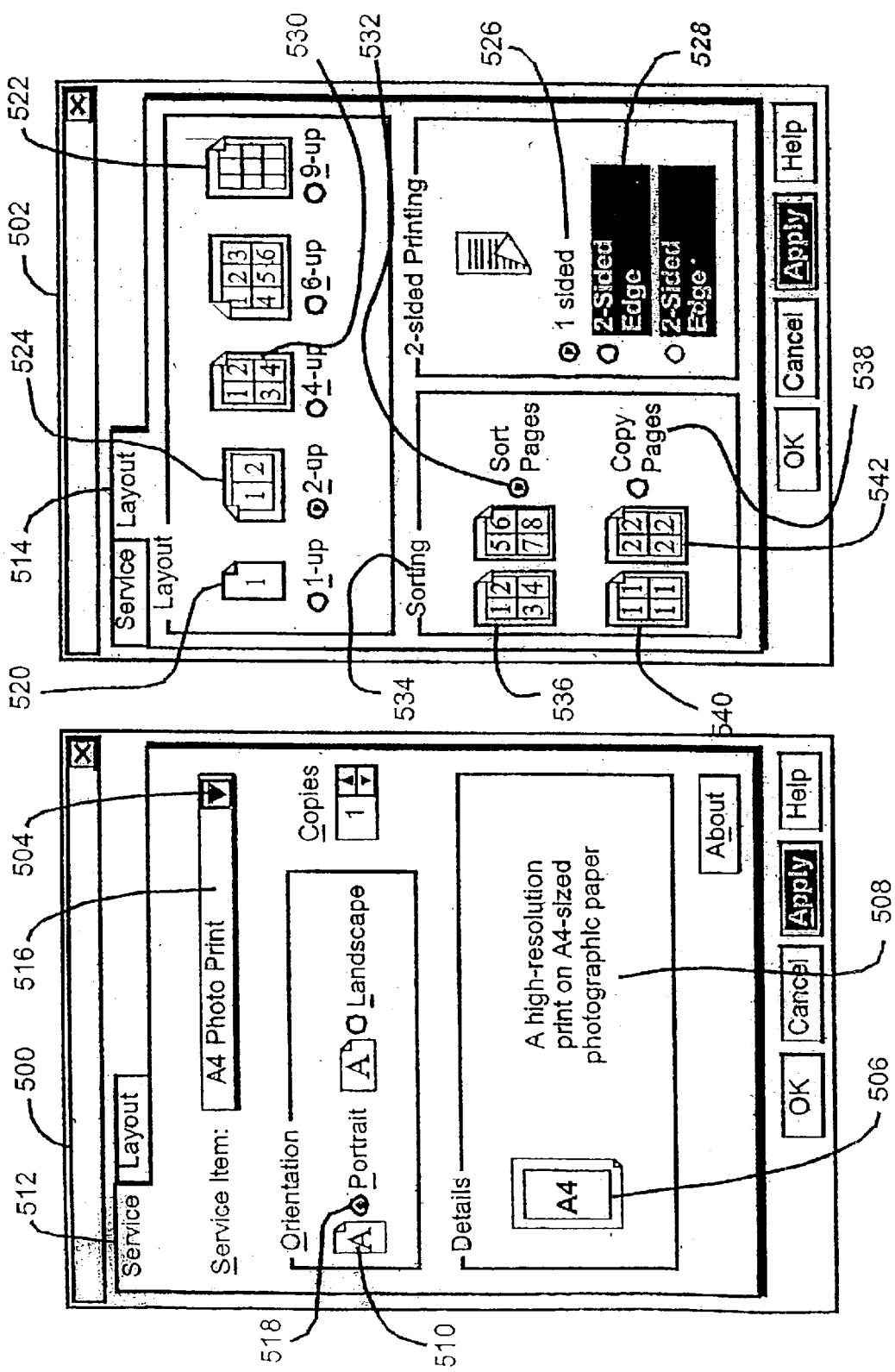
FIG. 7 shows an illustrative "dialog box" associated with the print process driver in FIG. 3.

FIG. 7 depicts a "dialog box" in the Windows® environment which is produced by the service item selection process 226 described in relation to FIG. 4. The dialog box has two views 500, and 502, these views corresponding to the "Service" election tab 512, and the "Layout" selection tab 514 respectively. When a user selects, using the service item selection process 226, a particular service item from the client service item file 310, the dialog box 500, 502 is responsive to the selection, in particular by "greying out" service item attributes which are not available for the particular service item selected. In the present specification, for ease of explanation, the "greying out" which is evident on an actual computer display is depicted by inverted (ie white letters on a black background) text. The user makes the service item selection by choosing a service item which becomes visible on a "drop down" menu which is provided by means of the selection tool 504. Accordingly, considering the service item (A) (ie 816, see FIG. 7), the service item name 816 is seen in the dialog box window 516. The printing layout attribute 806 makes available "1up", "2up", "4up", "6up" and "9up" options. This is mirrored, for example, by the availability of the "1up" option 520, and the "9up" option 522 in FIG. 7.

The "Xup" layout attributes refer to a manner in which pages in a document are layed out on a physical medium to which the document is printed. Accordingly, if the "1up" layout option 520 is selected, a document having four pages numbered 1 to 4 will be output so that each page of the document is printed on a separate physical page. If, on the other hand, a "4up" option 530 is selected, the four document pages will be printed in a reduced manner on a single output page, in an order depicted in 530. If a "Sort Pages" option 532 is selected in the "Sorting" attribute 534, then the aforementioned document will, as previously indicated, have the pages 1–4 printed on the single output page in the order indicated in 536. If, on the other hand, a "Copy Pages" option 538 is selected, then the first document page will be repetitively printed on a single output page 540 as indicated, the second document page will be repetitively printed on a single output page 538 as indicated, and so on.

Only 1 sided printing (ie 818) is available in the service item, and this is reflected in the fact that "1 sided" is available in the dialog box at 526, however "2 sided" ie 528 has been "greyed out" indicating that it is not available. Considering the service view 500, the user is able, by operating the selection scroll bar 504, to select from a range of available service items. In FIG. 5, the user has selected a service item "A4 Photo Print", this being explained by explanatory text 508, and an explanatory graphic icon 506. In addition, the user has the ability to select a "Portrait" paper orientation 510 and other attributes evident in the service view 500. Turning to the layout view 502, other selectable service item attributes are evident.

Figure 8:
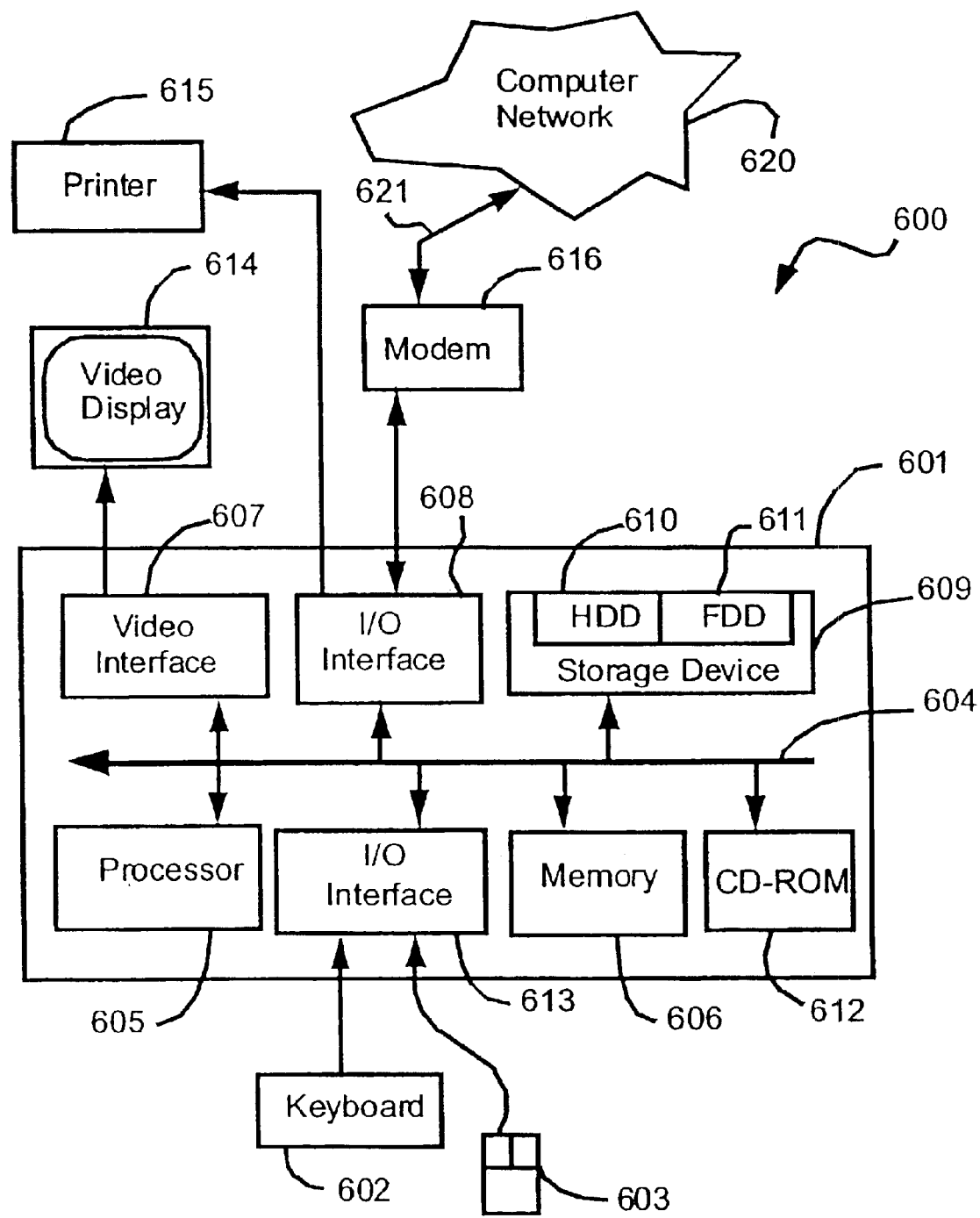
FIG. 8 is a schematic block diagram of a general purpose computer upon which the preferred embodiment of the present invention can be practiced.

The method of printing a print job is preferably practiced using a conventional general-purpose computer system 600, such as that shown in FIG. 8 wherein the process of FIG. 6 may be implemented as software, such as an application program executing within the computer system 600. In particular, the steps of the method of printing a print job are effected by instructions in the software that are carried out by the computer. The software may be divided into two separate parts; one part for carrying out the printing a print job methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for printing a print job in accordance with the embodiments of the invention.

The computer system 600 comprises a computer module 601, input devices such as a keyboard 602 and mouse 603, output devices including a printer 615 and a display device 614. A Modulator-Demodulator Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN).

The computer module 601 typically includes at least one processor unit 605, a memory unit 606, for example formed from semiconductor random access memory (RAM) and read only memory (ROM), input/output (I/O) interfaces including a video interface 607, and an I/O interface 613 for the keyboard 602 and mouse 603 and optionally a joystick (not illustrated), and an interface 608 for the modem 616. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 601, typically communicate via an interconnected bus 604 and in a manner which results in a conventional mode of operation of the computer system 600 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable medium including magnetic tape, a ROM or integrated circuit, a magneto-optical disk, a radio or infra-red transmission channel between the computer module 601 and another device, a computer readable card such as a PCMCIA card, and the Internet and Intranets including email transmissions and information recorded on websites and the like. The foregoing is merely exemplary of relevant computer readable mediums. Other computer readable medium may be practiced without departing from the scope and spirit of the invention.

The method of printing a print job may alternatively be implemented in dedicated hardware such as one or more integrated circuits performing the necessary functions or sub functions. Such dedicated hardware may include graphic processors, digital signal processors, or one or more microprocessors and associated memories.

INDUSTRIAL APPLICABILITY

It is apparent from the above that the embodiment(s) of the invention are applicable to the computer and data processing industries.

The foregoing describes only one embodiment of the present invention, and modifications and/or changes can be made thereto without departing from the scope and spirit of the invention, the embodiment being illustrative and not restrictive.

What is claimed is:

1. A printing system for printing a print job and having a client computer and a server computer, connected to a network and each having storage means respectively for storing a client service item file and a server service item file, each of which comprises a set of user selectable service items, each service item comprising a set of printing attributes; said printing system comprising:
   a comparison unit adapted to compare a time stamp associated with the client service item file with a time stamp associated with the server service item file;
   an update unit adapted to update the client service item file on the basis of the server service item file in accordance with a result of the comparison performed by said comparison unit; and
   a print process driver adapted to process a print job according to a particular set of printing attributes.

2. A printing system according to claim 1, wherein said server computer comprises a print application adapted to:
   update the client service item file on the basis of the server service item file which is associated with a plurality of printers, each printer supporting printing attributes of at least one of the user selectable service items; and
   print the processed print job on a specific printer supporting the particular set of printing attributes of the particular selected service item.

3. A printing system as in any one of claims 1 and 2, wherein said network is one or more of a dedicated connection, a local area network, and a wide area network.

4. A printing system according to claim 1, wherein a user interface of the client computer is conformed to a selected service item having a particular set of printing attributes dependent upon a user selection of a particular service item.

5. A printing system according to claim 1, wherein the print process driver comprises:
   file data conversion means for converting the print job using the particular set of printing attributes, thereby producing print file data matched to a specific printer.

6. A printing system according to claim 5, wherein the print job, being in a first page description language, is converted to the print file data, being in a second page description language, by said file data conversion means.

7. A printing system according to claim 6, wherein the first page description language is Windows® GDI® and the second page description language is Postscript®.

8. A printing system according to claim 2, further comprising print job storage means for storing the processed print job on the client computer in anticipation of printing by the print application.

9. A printing system according to claim 1, wherein the printing attributes relate to at least one of physical attributes of a printer, and generic attributes of the printer.

10. A printing system according to claim 1, wherein the printing attributes comprise at least one of:
    a service item name;
    an associated icon name;
    a page layout attribute;
    a single sided attribute;
    a two-sided attribute;
    a page size attribute;
    a print resolution attribute;
    a paper type attribute;
    an ink type attribute;
    a page orientation attribute;
    a color definition;
    a printed medium definition;
    a paper dimension; and
    at least one of top, bottom, left and right margin attributes.

11. A printing system according to claim 1, wherein the particular selected service item is associated with an explanatory graphical icon.

12. A printing system according to claim 2, wherein the client service item file updating is performed upon communication being established between the print application, the server computer, and the print process driver.

13. A printing system according to claim 1, wherein said update unit performs said updating if the result of the comparison indicates that the time stamp associated with the client service item file is older than the time stamp associated with the server service item file.

14. A method of printing a print job using a printing system comprising a client computer and a server computer, connected to a network and each having storage means respectively for storing a client service item file and a server service item file, each of which comprises a set of user selectable service items, each service item comprising a set of printing attributes; said method comprising steps of:
    comparing a time stamp associated with the client service item file with a time stamp associated with the server service item file;
    updating the client service item file on the basis of the server service item file in accordance with a result in said comparison step; and
    processing a print job, using a print process driver, according to a particular set of printing attributes.

15. A method according to claim 14, further comprising the steps of:
    updating, by a print application on the server computer, the client service item file on the basis of the server service item file which is associated with a plurality of printers, each printer supporting printing attributes of at least one of the user selectable service items; and
    printing the processed print job on a specific printer supporting the particular set of printing attributes of a particular selected service item.

16. A method as in any one of claims 14 and 15, wherein the network is one or more of a dedicated connection, a local area network, and a wide area network.

17. A method according to claim 14, comprising a further step of conforming a user interface of the client computer to a selected service item having a particular set of printing attributes dependent upon a user selection of a particular service item.

18. A method according to claim 14, wherein said processing step includes:
    converting the print job using the particular set of printing attributes; and
    producing print file data matched to a specific printer.

19. A method according to claim 18, wherein said converting step includes converting the print job, being in a first page description language, to print file data, being in a second page description language.

20. A method according to claim 19, wherein the first page description language is Windows® GDI® and the second page description language is Postscript®.

21. A method according to claim 15, further comprising, prior to printing the print job, a step of storing the processed print job on the client computer.

22. A method according to claim 14, comprising a further step of associating the particular selected service item with an explanatory graphical icon.

23. A method according to claim 15, further comprising a step of updating the client service item file dependent upon communication being established between the print application, the server computer, and the print process driver.

24. A computer readable memory medium for storing a program for executing a method for controlling an apparatus which prints a print job; said program comprising:

code for comparing a time stamp associated with a client service item file stored on a client computer with a time stamp associated with a server service item file stored on a server computer, the client computer and the server computer being connected to a network, each service item file comprising a set of user selectable service items, and each service item comprising a set of printing attributes;

code for updating the client service item file on the basis of the server service item file in accordance with a result of the comparison performed by said comparison code; and code for processing a print job, using a print process driver, according to a particular set of printing attributes.

25. A computer readable memory medium according to claim 24, said program further comprising:

code for updating, by a print application on the server computer, the client service item file on the basis of the server service item file which is associated with a plurality of printers, each printer supporting printing attributes of at least one of the user selectable service items; and code for printing the processed print job on a specific printer supporting the particular set of printing attributes of a particular selected service item.

26. A computer readable memory medium as in any one of claims 24 and 25, wherein the network is one or more of a dedicated connection, a local area network, and a wide area network.

27. A computer readable memory medium according to claim 24, said program further comprising code for conforming a user interface of the client computer to a selected service item having a particular set of printing attributes dependent upon a user selection of the service item.

28. A computer readable memory medium according to claim 24, wherein said processing code includes:

code for converting the print job using the particular set of printing attributes; and code for producing print file data matched to a specific printer.

29. A computer readable memory medium according to claim 28, wherein said converting code comprises code for converting the print job, being in a first page description language, to print file data, being in a second page description language.

30. A computer readable memory medium according to claim 29, wherein the first page description language is Windows® GDI® and the second page description language is Postscript®.

31. A computer readable memory medium according to claim 25, further comprising, code for storing the processed print job on the client computer prior to printing the print job.

32. A computer readable memory medium according to claim 24, further comprising code for associating the particular service item with an explanatory graphical icon.

33. A computer readable memory medium according to claim 25 further comprising code for updating the client service item file dependent upon communication being established between the print application, the server computer, and the print process driver.

34. A printing system adapted to control at least one of a plurality of printers to print a print job having a client computer and a server computer, connected to a network and respectively having storage means for storing a service item file which comprises a set of user selectable service items, each service item comprising a set of printing attributes; said printing system comprising:

icon storage in the client computer adapted to store a client icon file having icons which are associated with the user selectable service items in the client service item file;

icon storage in the server computer adapted to store a server icon file having icons which are associated with the user selectable service items in the server service item file, wherein the server icon file is updated dependant upon a change to the plurality of printers;

a comparison unit adapted to compare a time stamp associated with the client icon file with a time stamp associated with the server icon file;

an update unit adapted to update the client icon file on the basis of the server icon file in accordance with a result of the comparison performed by said comparison unit; and a print process driver adapted to process a print job according to a set of printing attributes.

35. A printing system according to claim 34, wherein said update unit performs said updating if the result of the comparison indicates that the time stamp associated with the client icon file is older than the time stamp associated with the server icon file.

36. A method for printing a print job on at least one of a plurality of printers using a printing system comprising a client computer and a server computer, connected to a network and respectively having storage means for storing a service item file which comprises a set of user selectable service items, each service item comprising a set of printing attributes; said method comprising the steps of:

storing, in an icon storage in the client computer, a client icon file having icons which are associated with the user selectable service items in the client service item file;

storing, in an icon storage in the server computer, a server icon file having icons which are associated with the user selectable service items in the server service item file, wherein the server icon file is updated dependant upon a change to a plurality of printers;

comparing a time stamp associated with the client icon file with a time stamp associated with the server icon file;

updating the client icon file on the basis of the server icon file in accordance with a result of the comparison in said comparison step; and processing a print job, using a print process driver, according to the set of printing attributes.

37. A computer readable memory medium storing a program executing a method for controlling a printing system printing a print job, the printing system comprising a client computer and a server computer, connected to a network and respectively having storage means for storing a service item file which comprises a set of user selectable service items, each service item comprising a set of printing attributes; said program comprising:

code for storing, in an icon storage in the client computer, a client icon file having icons which are associated with the user selectable service items in the client service item file;

code for storing, in an icon storage in the server computer, a server icon file having icons which are associated with the user selectable service items in the server service item file, wherein the server icon file is updated dependant upon a change to a plurality of printers;

code for comparing a time stamp associated with the client icon file with a time stamp associated with the server icon file;

code for updating the client icon file on the basis of the server icon file in accordance with a result of the comparison by said comparison code; and code for processing a print job, using a print process driver, according to the set of printing attributes.

38. A printing system adapted to control at least one of a plurality of printers to print a print job, said system having a client computer and a server computer, connected to a network and respectively having storage means for storing a service item file which comprises a set of user selectable service items, each service item comprising a set of printing attributes; said printing system comprising:

a first update unit adapted to update a server service item file dependent upon a change to the plurality of printers;

an assignment unit adapted to assign an update label to the updated server service item file, wherein the update label is a version number; and a second update unit adapted to update a client service item file dependent upon the version number of the server service item file.

39. A method of printing a print job in a printing system controlling a plurality of printers, the system comprising a client computer and a server computer, connected to a network and respectively having storage means for storing a service item file which comprises a set of user selectable service items, each service item comprising a set of printing attributes; said method comprising the steps of:

updating a server service item file dependent upon a change to the plurality of printers;

assigning an update label to the updated server service item file, wherein the update label is a version number; and updating a client service item file dependent upon the version number of the server service item file.

40. A computer readable memory medium storing a program executing a method for controlling a plurality of printers in a printing system to print a print job, the printing system comprising a client computer and a server computer, connected to a network and respectively having storage means for storing a service item file which comprises a set of user selectable service items, each service item comprising a set of printing attributes; said program comprising:

code for updating a server service item file dependent upon a change to the plurality of printers;

code for assigning an update label to the updated server service item file, wherein the update label is a version number, and code for updating a client service item file dependent upon the version number of the server service item file.

* * * * *